US008514987B2

(12) United States Patent
Katayama et al.

(10) Patent No.: US 8,514,987 B2
(45) Date of Patent: Aug. 20, 2013

(54) COMPENSATION FOR DATA DEVIATION CAUSED BY FREQUENCY OFFSET USING TIMING CORRELATION VALUE

(75) Inventors: Yasunao Katayama, Kanagawa (JP); Daiju Nakano, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 12/974,078

(22) Filed: Dec. 21, 2010

(65) Prior Publication Data

US 2011/0150151 A1    Jun. 23, 2011

(30) Foreign Application Priority Data

Dec. 22, 2009    (JP) .................................. 2009-290645

(51) Int. Cl.
*H04L 27/06*    (2006.01)
(52) U.S. Cl.
USPC ........... 375/344; 375/316; 375/324; 375/326; 375/340
(58) Field of Classification Search
USPC .......................... 375/344, 316, 324, 326, 340
See application file for complete search history.

(56) References Cited

U.S. PATENT DOCUMENTS

| 5,376,894 | A | 12/1994 | Petranovich | |
|---|---|---|---|---|
| 5,909,470 | A * | 6/1999 | Barratt et al. | 375/324 |
| 6,275,543 | B1 * | 8/2001 | Petrus et al. | 375/324 |
| 2001/0031022 | A1 * | 10/2001 | Petrus et al. | 375/324 |

FOREIGN PATENT DOCUMENTS

| JP | 5-227241 A | 9/1993 |
|---|---|---|
| JP | 6232930 | 8/1994 |
| JP | 6-261091 A | 9/1994 |
| JP | 2000022649 | 1/2000 |
| JP | 2000341259 | 12/2000 |
| JP | 2002-084267 A | 3/2002 |
| JP | 2002532956 | 10/2002 |
| JP | 2003-188772 A | 7/2003 |
| JP | 2005-217585 A | 8/2005 |
| JP | 2007-189654 A | 7/2007 |
| JP | 2008-082978 A | 4/2008 |
| JP | 2009-010464 A | 1/2009 |

OTHER PUBLICATIONS

N. Ohba et al., "A Baseband Development . . . Communications" Forum on Information Technology Collection of Papers, Information Processing Society of Japan, 2009, pp. 57-60.
Y. Katayama and D. Nakano, "Multi-Gbps Wireless Systems over 60-GHz SiGe Radio Link with BW-Efficient Noncoherent Detections," ICME 2008.

* cited by examiner

*Primary Examiner* — Ted Wang
(74) *Attorney, Agent, or Firm* — Ido Tuchman; E. Dwayne Nelson (57) ABSTRACT

A method and circuitry for detecting a frequency offset ($\Delta$) between data at a transmission symbol rate (fTx) transmitted from a transmitter and a reception sampling frequency (fRx) operating in a receiver on the basis of hard decision based on a binary number in the receiver. The receiver uses a converter to make binary hard decisions performs n times oversampling, then obtains a symbol decision value, calculates a timing correlation value for each plurality of partition phases, and calculates a cumulative timing correlation value for a specific period or number of additions. The receiver determines whether its sampling frequency is higher or lower than a correct symbol rate, appropriately shifts a sampling position, and makes reception while maintaining the correct sampling position thereby enables data deviation caused by a frequency offset to be compensated on the fly.

13 Claims, 5 Drawing Sheets

FIG. 1

BPF: (BAND-PASS FILTER)
FMD: (FM DISCRIMINATOR)
AMP. : (AMPLIFIER)

FIG. 2

DATA OVERSAMPLED AT THREE TIMES IS PARTITIONED
INTO THREE PHASES HAVING SAME SYMBOL PERIOD BY DEMUX,
AND PREAMBLE DETECTION IS PERFORMED AT EACH PHASE

EXAMPLE PREAMBLE DETECTION CIRCUIT

COMPENSATION FOR DATA DEVIATION CAUSED BY FREQUENCY OFFSET USING TIMING CORRELATION VALUE

CROSS-REFERENCE TO RELATED APPLICATIONS

This application claims priority under 35 U.S.C. §119 to Japanese Patent Application No. 2009-290645 filed Dec. 22, 2009, the entire contents of which are incorporated by reference herein.

BACKGROUND OF THE INVENTION

1. Field of the Invention

The present invention relates to detection of a frequency offset occurring between a transmitter and a receiver in wireless communication and compensation for it.

2. Description of the Related Art

Frequency Offset of Transmitter And Receiver

Generally, in wireless communication, a clock (fTX) used in a transmitter (Tx) and a clock (fRx) used in a receiver (Rx), the clocks being for use in processing data at a certain rate, have errors in accuracy even when they have the same frequency. Specifically, a guarantee frequency value of a used quartz oscillator typically has an accuracy of 50 ppm or 100 ppm for a common wireless product. This slight frequency difference (frequency offset) between the transmitter and the receiver is a problem in actual data transmission and reception. For example, when an error of 50 ppm is present, for a time period for which the transmitter transmits 20,000 symbols, the receiver receives symbols one more or less than the transmitted symbols.

Under such a condition, as data is transmitted, sampling timing gradually deviates, and the data becomes unable to be obtained at a correct sampling position. Thus the data is incorrect in midstream, and this leads in an undesired result in wireless communication. Such data deviation caused by a frequency offset occurs in every wireless transmitter and receiver, so a technique for compensating for it is required. In particular, for time division packet communication, it is necessary to make the compensation during a packet period. In addition, from the viewpoint of balance with overhead of a used packet format and the limitation of a buffer size, where possible, a method of performing the compensation on the fly is desired.

Frequency Offset Compensation In Ultra-High Speed Wireless Communication

Nowadays, ultra-high speed wireless communication over gigabit per second (Gbps) is being developed and various standardizations are also being advanced. For example, for IEEE 802.15.3c, transmission and reception using the time division multiple access (TDMA) scheme is defined, and a frequency error between a transmitter and a receiver is defined as within 50 ppm. When packet communication is performed at such a data rate exceeding Gbps, it is important how a frequency error of 50 ppm is compensated. In contrast to a traditional low-frequency range wireless communication, which is at approximately 100 megabit per second (Mbps) at the best, high data rate communication needs compensation in a receiver to be performed more promptly.

Although there are many configurations of a transmitter and a receiver in ultra-high speed wireless communication, space saving, low power consumption, and low cost are important factors for portable devices. In particular, because of its high data rate, such ultra-high speed wireless communication imposes a heavier load on an AD converter of a receiver, in comparison with traditional low-speed radio communication. In the case of four times oversampling, power of approximately 10 giga-samples per second (Gsps) is needed, and a resolution of 6 to 8 bits at such a sampling rate is technically difficult. Additionally, low power consumption and low cost described above is very difficult. One example approach to this issue is a scheme of receiving data non-coherently using a 1-bit AD converter (or a bit slicer or a comparator) (FIG. 1 illustrates a scheme of receiving data non-coherently using a 1-bit AD converter (ADC) (or a bit slicer or a comparator).

Figure 1:
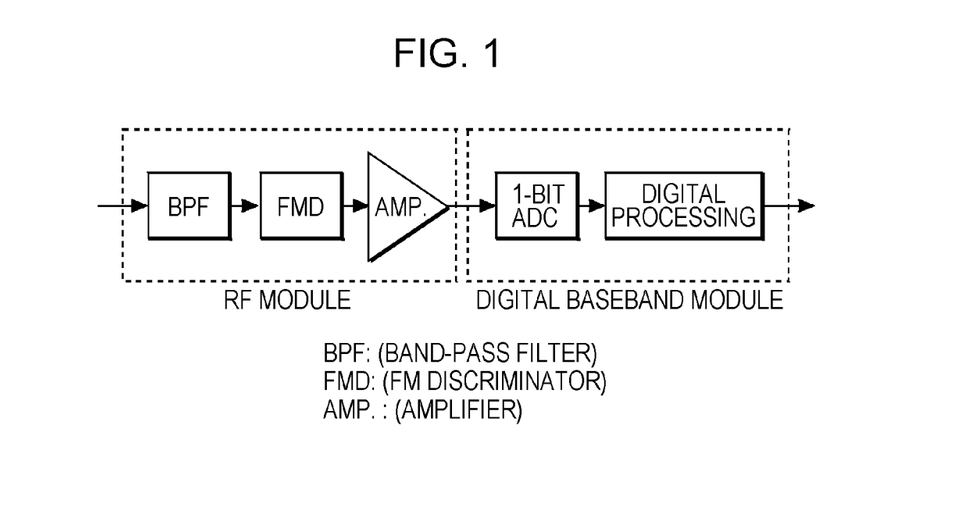
FIG. 1 illustrates a scheme of receiving data non-coherently using a 1-bit AD converter (bit slicer, or comparator).

The wireless communication system illustrated in FIG. 1 is characteristic in that a frequency discriminator called a frequency modulation discriminator (FMD) is used and its output is sampled by a 1-bit AD converter. Examples of a modulation scheme to which this configuration is applicable include frequency modulation, such as frequency shift keying (FSK) or minimum shift keying (MSK), and $\pi/2$ binary phase shift keying (BPSK). The use of a 1-bit AD converter without using a multi-level AD converter eliminates the necessity of expensive circuitry and can achieve reduced power consumption by restricting an amplitude direction to binary. On the other hand, because information in an amplitude direction is binarized, a frequency offset must be compensated for using less received information.

In summarizing problems, a desired technique of compensating for a frequency offset for use in ultra-high speed wireless communication exceeding at the aim at space saving, low power consumption, and low cost needs the following conditions:

Transmission and reception scheme using 1-bit AD converter
On-the-fly compensation during packet period
Oversampling rate of 1-bit AD converter being three times symbol rate
Without use of known pattern such as pilot word.

A common approach to compensate for a frequency offset is a method called automatic frequency control (AFC). There are many known techniques for AFC. One AFC technique is calculating information regarding a phase, such as a phase difference or a phase itself, from a received signal and an estimated correct value, determining from the value whether a frequency of a receiver is higher or lower than a frequency of a transmitter, providing a local oscillator of the receiver with feedback, and adjusting the frequency of the receiver to the frequency of the transmitter. This is a technique called carrier synchronization and is illustrated in Japanese Unexamined Patent Application Publication No. 5-227241. A way of inserting a known pattern called a pilot word in an appropriate place of transmission data, calculating phase difference information by detecting it, and providing a local oscillator of a receiver with feedback is described in Japanese Unexamined Patent Application Publication No. 6-261091 and Japanese Unexamined Patent Application Publication No. 2005-217585.

Another AFC technique is a method of performing proper compensation calculation on reception data without carrier synchronization and thus returning to correct reception data. U.S. Pat. No. 5,376,894 (which is translated in Japanese Unexamined Patent Application Publication No. 8-505499) illustrates a method of calculating the amount of a frequency offset using a known pattern called a unique word (whose meaning is the same as a pilot word), calculating the quantity of deviation corresponding to the frequency offset from reception data, and returning to correct data. Japanese Unexamined Patent Application Publication No. 2007-189654 describes a technique of estimating a frequency offset by detecting only a leading edge from transition of reception data, multiplying the reception data by a phase rotation factor corresponding to the amount of the frequency offset, and thus recovering data. Unfortunately, this technique depends on a digital modulation scheme. That is, it is effective only for a modulation scheme that does not pass through a zero in an IQ plane, specifically, π/2 BPSK, π/4 differential quadrature phase-shift keying (DQPSK), and Gaussian minimum shift keying (GMSK). With a modulation scheme that passes through a zero, an error occurs in calculation of a frequency offset.

SUMMARY OF THE INVENTION

Techniques using AFC circuits as described in the related art can be a possible approach. However, they take much time to provide an analog circuit with feedback. Thus in packet communication at a high data rate, carrier synchronization within a specific time period is difficult. Accordingly, a technique of regulating data deviation caused by a frequency offset at a digital domain using received data is desired.

Another possible approach can be a technique using a known pattern such as a pilot word. For instance, in IEEE 802.15.3c, pilot words are defined as standard, but they are optional. Therefore, a method of compensating for a frequency offset independently of the content of transmission data is desired. Additionally, for a non-coherent detection scheme in which a frequency modulation signal is received using a frequency discriminator, such as FSK or MSK, phase information is instantly lost from received data. Because of this, a compensation method using phase information in the related art is difficult to implement. One effective approach is storing data for a sufficient long period and statistically processing it.

In the related art, because a data rate is in the range from several kbps to several hundred Mbps at most, an oversampling rate can be set sufficiently higher than a symbol rate. However, for ultra-high speed wireless communication at a data rate exceeding Gbps, because a sufficiently higher oversampling rate at or above 10 times a symbol rate cannot be set, it is difficult to apply the above-described techniques as it is.

At a receiver using a 1-bit AD converter, two to three times oversampling is performed, a correlation value called a timing correlation value is calculated, and a cumulative timing correlation value in which the correlation values are accumulated only during a period of a specific number of symbols is calculated.

Whether a sampling rate of the receiver is higher or lower than a correct symbol rate is determined from that value. In response to the determination, the sampling position is appropriately shifted, and reception is made while the correct sampling position is maintained.

With this technique, a sampling position can be kept track of after a pattern for use in packet detection called a preamble is detected, and data deviation caused by a frequency offset can be compensated.

DETAILED DESCRIPTION OF THE PREFERRED EMBODIMENTS

A receiver system illustrated in FIG. 1 previously introduced is discussed as an example. An oversampling rate of a 1-bit AD converter is assumed to be three times a symbol rate. This is easily extendable by a person skilled in the art as long as it is n or more times, where n is a natural number more than two. With three times oversampling, three sampling points are obtainable per symbol (also illustrated in the upper right section of FIG. 4). Obtained data is an output of the 1-bit AD converter and can be −1 or 1 (−1, 1) or can be 0 or 1 (0, 1).

The outline of a process according to an embodiment of the present invention is described using the following steps 1, 2, 3, and 4.

Figure 2:
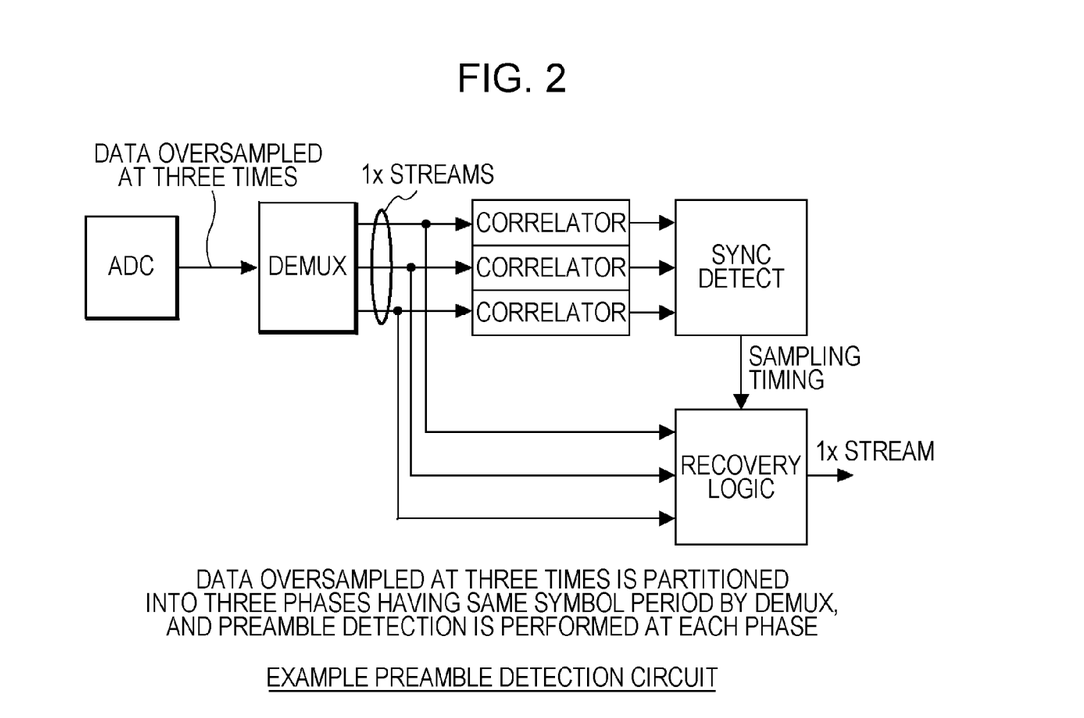
FIG. 2 illustrates circuitry that achieves preamble detection and symbol decision.

FIG. 2 illustrates circuitry that achieves preamble detection and symbol decision.

Step 1 Preamble Detection (FIG. 2)

Because of three times oversampling, by demultiplexing (Demux) into three "partition phases" of phase 1, phase 2, and phase 3, preamble detection is performed at each phase. One example preamble pattern can be a complementary Golay sequence for IEEE 802.15.3c. However, any sequence, for example, M sequence or Gold sequence, can be used as long as it is a strong autocorrelation pattern. Autocorrelation values of this preamble pattern at the three phases are calculated through three correlators to achieve packet detection and symbol synchronization.

Step 2 Symbol Decision (FIG. 2)

Symbol synchronization (SYNC) is estimated to be achieved in the leading section of a packet by the preamble detection. One symbol decision value can be determined from three sampling data elements. Examples of the determination technique include interpolation decision in consideration of previous and next values, majority decision, weighted mean value decision in consideration of a correlated value (determined from preamble detection) at each phase, and simple decision using the middle value selected from among the three symbol decision values. This corresponds to Recovery Logic in FIG. 2.

Step 3 Calculation of Timing Correlation Value And Calculation of Cumulative Timing Correlation Value (FIG. 2)

A determined symbol decision value and reception data associated with its symbol period are multiplied when binary (1, −1) is used or "exclusive-or" thereof is calculated when binary (1, 0) is used to calculate a timing correlation value. If the timing correlation value is 1, this means that the data is the same as the determined symbol; if the timing correlation value is −1, this means that they are different. Cumulative addition (Σ) of the timing correlation values for a specific number of symbols enables deviation in each phase from the determined symbol to be statistically identified. The cumulatively added timing correlation value is referred to as "cumulative timing correlation value." This value is calculated for each partition phase.

Step 4 Offset Compensation

Cumulative timing correlation values for three phases are compared. If there is a phase whose cumulative timing correlation value is smaller than a specific threshold, the phase is determined as being close to zero crossing, and its data is shifted by one. That is, demultiplexing on the phases 1, 2, and 3 up to that time is switched and shifted by one. This causes a neighboring phase to newly lie in a sampling position in the vicinity of the center of an eye diagram and enables correct symbol decision.

Figure 3:
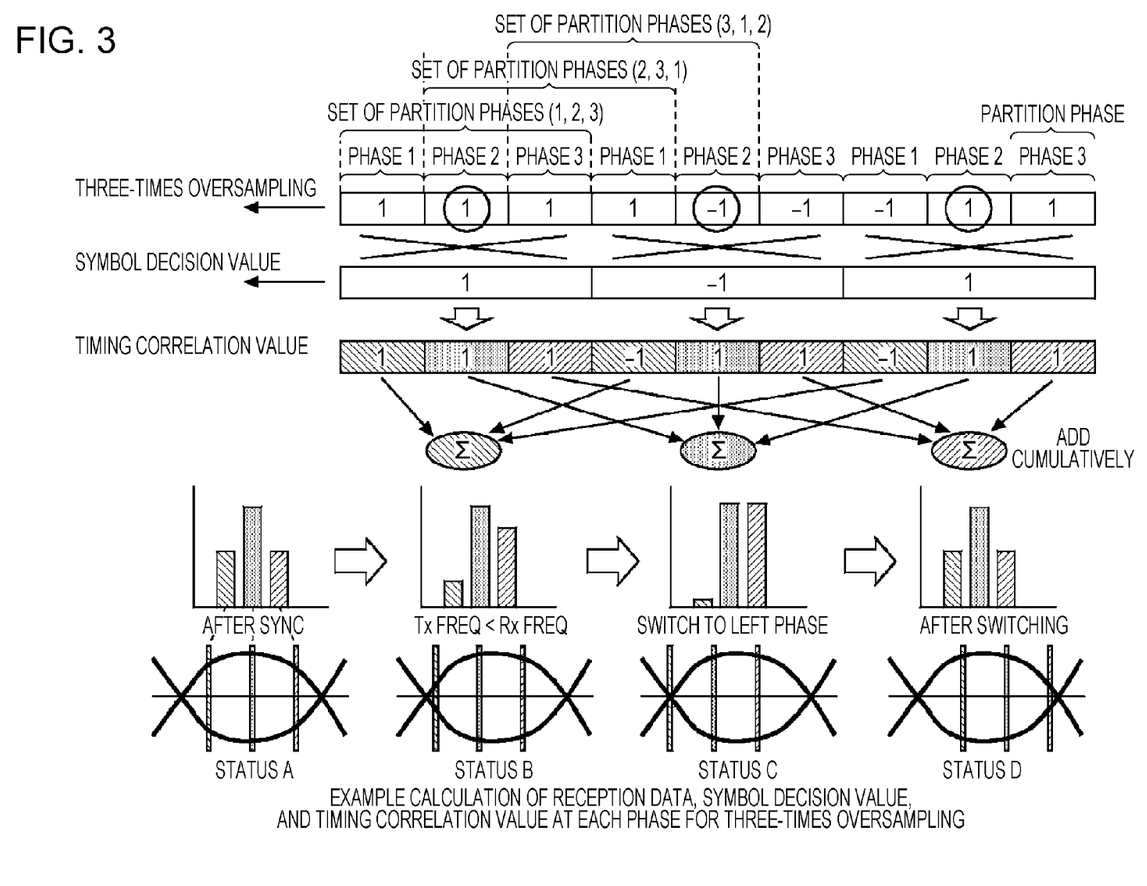
FIG. 3 is a schematic diagram for describing a technique according to an embodiment of the present invention.

FIG. 3 is a schematic diagram for describing the technique according to the embodiment of the present invention. This drawing schematically illustrates the steps 1, 2, 3, and 4.

Figure 4:
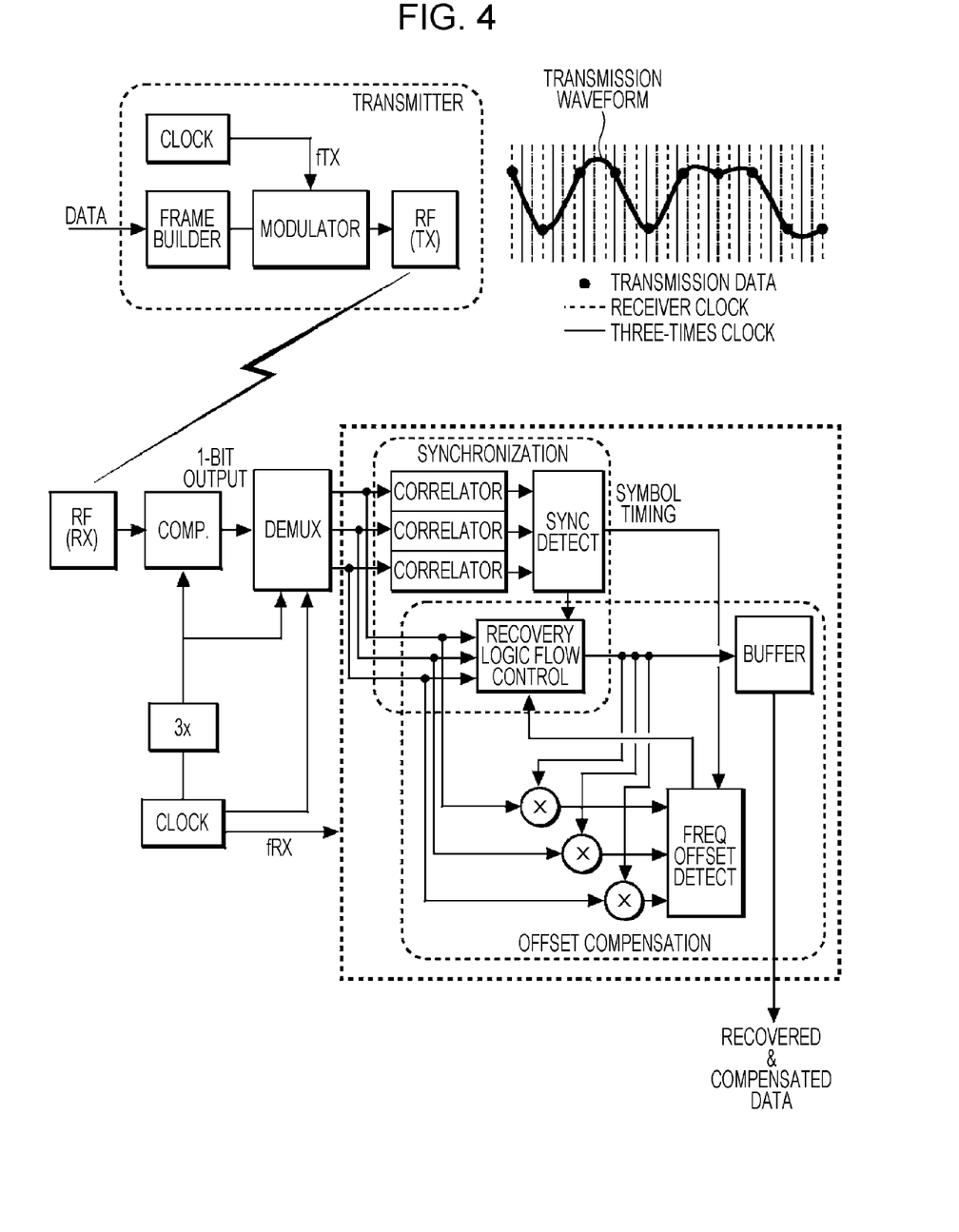
FIG. 4 illustrates circuitry in which a circuit for calculating a cumulative timing correlation value and a circuit for compensating for an offset are added to the configuration of FIG. 2 to achieve the technique according to the embodiment of the present invention.

FIG. 4 illustrates circuitry in which a circuit for calculating a cumulative timing correlation value and a circuit for compensating for an offset are added to the configuration of FIG. 2 to achieve the technique according to the embodiment of the present invention. The synchronization section and the offset compensation section are characteristic. This circuitry configuration can be typically achieved as hardware to pursue higher processing speeds. However, it can also be achieved in part or in entirety as a computer program being software causing a computer to execute instructions or as a combination of hardware and software.

Further details of each step are described below.

Step 1

To perform preamble detection, a sequence having strong autocorrelation, for example, complementary Golay sequence defined for IEEE 802.15.3c, is transmitted as a known pattern, and the pattern is detected by a receiver. In the case of a complementary Golay sequence, autocorrelation can be calculated by an inner product when obtained binary numbers are 1 and −1. Preamble detection of data corresponds to determination of which set of partition phases among the sets (phase 1, phase 2, phase 3), (phase 2, phase 3, phase 1), and (phase 3, phase 1, phase 2) is in synchronism with a symbol in FIG. 3.

Figure 5:
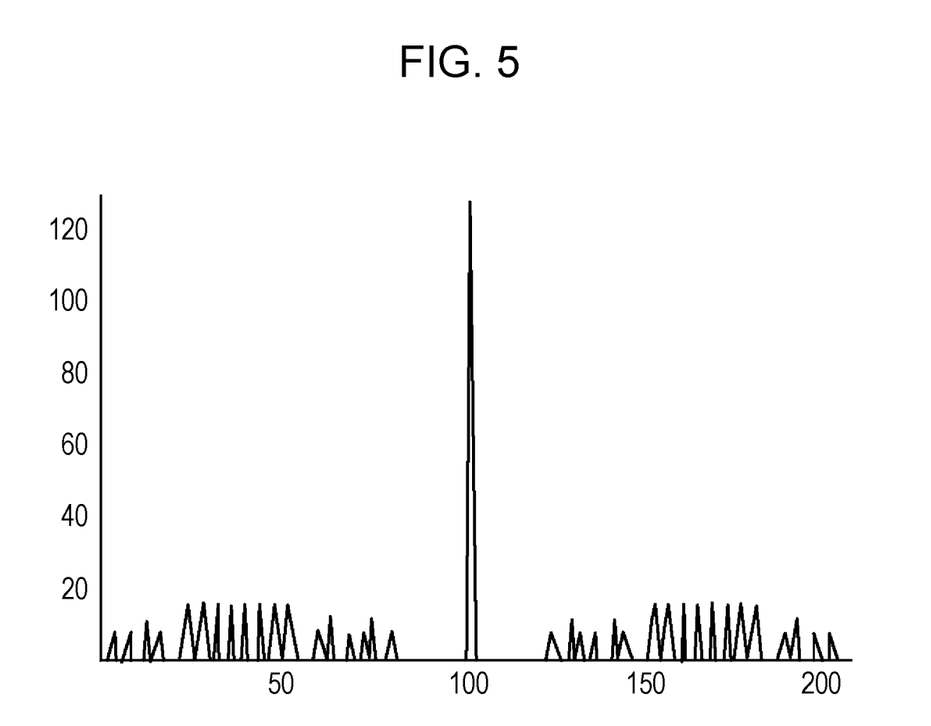
FIG. 5 illustrates autocorrelation of a Golay sequence.

FIG. 5 illustrates autocorrelation of a Golay sequence. The position corresponding to the strongest autocorrelation is a position from which data has been transmitted in the Golay sequence, and that position is the symbol synchronization position. This enables both symbol synchronization and frame synchronization.

Step 2

There are several techniques for symbol decision from three times (3×) oversampling. That is, one value is determined from three values. As an example, a case in which autocorrelation values at three phases for 3× are 0.8, 1, and 0.1 and a set of symbols to be determined are −1, 1−, and −1 is discussed below.

1. Interpolation Decision Using Autocorrelation Value As Weight

Depending on the number of symbols between which interpolation is performed, for example, in the case of the above-described settings, because the initial two are strong autocorrelation values, the correct sampling position is estimated to be present between the two. If interior division of (−1×0.8)+ (1×1) is performed, then 0.2 is obtained. This is a positive value, so the decision is 1. Of course, an appropriate function can be defined. For example, a cubic function or a quadratic function can be defined, and interpolation at two or three points can be calculated.

2. Decision of Majority Logic

The most common value is selected from among three values. In this case, the decision is 1.

3. Simple Decision

The middle value is selected. In this case, the decision is 1. This example is illustrated in FIG. 3 as selecting the circled values at each phase 2 being the middle value from among the three symbol decision values of the phases 1, 2, and 3.

4. Decision of Majority Logic Using Autocorrelation Value As Weight

In this case, (−1×0.8)+(1×1)+(−1×0.1)=0.1 is calculated. The result 0.1 is a positive value, so the decision is 1.

With the above-described techniques, "symbol Decision" can be made.

Step 3

A timing correlation value can be defined as follows:
Timing Correlation Value=Obtained binary data (1 or −1)× Symbol Decision Value For example, when obtained binary data elements at three phases are −1, 1, and −1 and the symbol decision value in step 2 is 1, the timing correlation values are −1, 1, and −1. By cumulatively adding the values for a specific period or for a specific number of symbols, a cumulative timing correlation value is obtained. The specific number of symbols can be set in advance. This is determined by the size of an offset to be compensated for and determines specifications of a device. Specifically, one example case where a frequency offset of 50 ppm is to be compensated for is discussed. In this case, because 1 symbol deviates for 20,000 symbols according to calculation, in order to check a change with a time of ½0 thereof, cumulative timing correlation values for 1,000 symbols are calculated and their changes are kept track of.

Step 4

Figure 6:
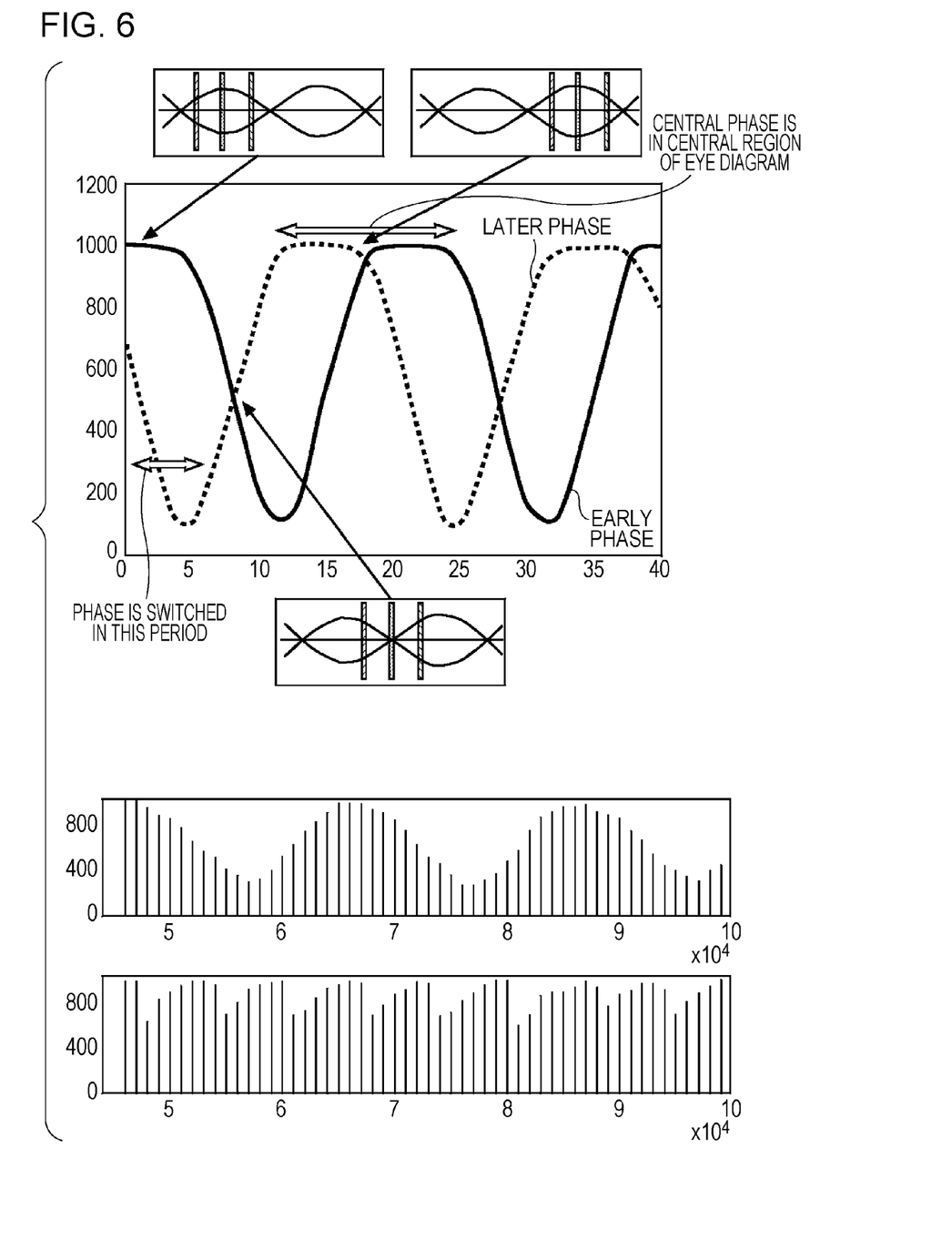
FIG. 6 is graphs of cumulative timing correlation values of an early phase and a later phase among three phases.

FIG. 6 is graphs of cumulative timing correlation values of, in particular, an early phase and a later phase among three phases. The situation is predicated on that the sampling frequency at a reception side is lower than that at a transmission side by 50 ppm, S/N is 20 dB, the number of cumulative symbols is 1,000 symbols, and simple decision is used as the symbol decision technique.

Initially, synchronization is achieved, so the central phase is in the center of an eye diagram. In this case, a cumulative timing correlation value in an early phase and that in a later phase are substantially the same. Because the sampling frequency at the reception side is lower than that at the transmission side, the sampling position is gradually shifted rightward in the eye diagram. Then the sampling position in the later phase gets close to zero crossing and the cumulative timing correlation value decreases. This is because a possibility in which the value in the later phase gradually differs from a symbol decision value increases.

When the central phase gets close to zero crossing, a cumulative timing correlation value in the early phase also decreases. When it reaches zero crossing, the symbol decision value is uncertain, and the cumulative timing correlation value in the early phase and that in the later phase become substantially the same value again. This process is repeated. In contrast, if the sampling frequency at the reception side is higher, the sampling position is shifted leftward in the eye diagram, and the cumulative timing correlation value in the early phase gradually decreases. Accordingly, whether the sampling frequency at a reception side is higher or lower than that at a transmission side can be determined by keeping track of changes in the cumulative timing correlation value in the early phase and that in the later phase and detecting which decreases first.

In addition, offset compensation made before the central phase reaches zero crossing enables the sampling position to be in the vicinity of the center of the eye diagram.

Through these steps, the reception side can obtain reception data in the proper quantity with a single clock without changing the clock. Offset compensation can cause data to be discontinuous from the viewpoint of the clock at the reception side (if the clock at the reception side is higher than that at the transmission side). When a buffer (Buffer in the circuitry illustrated in FIG. 4) having a depth of $\Delta \times L$ at maximum, where the proportion of a frequency offset is $\Delta$ and the size of a packet to be transmitted is L symbols, is prepared, data output from the buffer has no gap.

The technique is one in which, in wireless communication at high data rates exceeding Gbps, when a reception side has binary output (specifically, for demodulation of frequency modulation by an FM discriminator), if there is an offset caused by accuracy error between the clock of the reception side and the clock at the transmission side, the offset is compensated for by the digital circuitry (FIG. 4) to obtain data in the proper quantity without changing the clock of the receiver.

To achieve this, by the use of N times oversampling, where n is a natural number more than two, first, symbol synchronization is achieved by preamble detection. In the case of three times oversampling, timing correlation values at three phases are calculated. A timing correlation value is the value in which obtained data at each phase and a symbol decision value determined from three phases are multiplied. A value in which these timing correlation values are cumulatively added for a specific number of symbols is referred to as a cumulative timing correlation value. At an initial stage where synchronization is achieved, symbol timing (the center of an eye diagram) is in the vicinity of the central phase position. Therefore, the sampling position is gradually shifted by an offset.

The cumulative timing correlation value at each of an early phase and a later phase in the same symbol period is kept track of. When the cumulative timing correlation value decreases and becomes smaller than a specific threshold, the central phase is close to zero crossing. A shift by switching to a set of three phases in which the next phase is central (see FIG. 3) is made. This enables the central phase in the same symbol period to be always at the correct sampling position and thus enables data to be properly obtained. In particular, where the proportion of an offset is $\Delta$ and the size of a packet to be transmitted is L symbols, when a buffer having a depth of $\Delta \times L$ is prepared, data having no gap and matching the clock at the reception side can be reproduced.

We claim:

1. A method of detecting a frequency offset (A) between data at a transmission symbol rate (fTx) transmitted from a transmitter and a reception sampling frequency (fRx) operating in a receiver on the basis of hard decision based on a binary number in the receiver, the method comprising:

demultiplexing by an electrical circuit a wireless signal transmitted by the transmitter and received by the receiver into a plurality of partition phases;

a data oversampling step of making a hard decision about which binary number (1 or −1) or (1 or 0) is assigned to each of the plurality of partition phases, (phase 1, phase 2, and phase 3), the plurality of partition phases being obtained by sampling in which a symbol is divided into n sections in accordance with an oversampling frequency at or above n times the reception sampling frequency, where n is a natural number more than two;

a step of obtaining a binary symbol decision value by making a symbol decision from the binary numbers of the plurality of partition phases subjected to the hard decision;

a step of obtaining a timing correlation value for each of the plurality of partition phases by calculating correlation between a binary number of the symbol decision value and a binary number of a partition phase subjected to the hard decision in a symbol period associated with the symbol decision value by performing multiplication when the binary number (1, −1) is assigned or performing "exclusive-or" when the binary number (1, 0) is assigned;

a step of cumulatively adding the obtained timing correlation values for a specific period or for a specific number of symbols to obtain a cumulative timing correlation value; and     a step of comparing a plurality of cumulative timing correlation values among the plurality of partition phases to obtain the frequency offset (A).

2. The method according to claim 1, further comprising, prior to the data oversampling step:

a step of performing preamble detection on the data and determining which set of partition phases among sets (phase 1, phase 2, phase 3), (phase 2, phase 3, phase 1), and (phase 3, phase 1, phase 2) is in synchronism with the symbol.

3. The method according to claim 1, wherein the data is a packet and wherein compensation is made within a packet period.

4. A method of detecting a frequency offset (Δ) between data at a transmission symbol rate (fTx) transmitted from a transmitter and a reception sampling frequency (fRx) operating in a receiver on the basis of hard decision based on a binary number in the receiver, the method comprising:

demultiplexing by an electrical circuit a wireless signal transmitted from the transmitter and received by the receiver into a plurality of partition phases;

a data oversampling step of making hard decision about which binary number (1 or −1) or (1 or 0) is assigned to each of the plurality of partition phases (phase 1, phase 2, and phase 3), the plurality of partition phases being obtained by sampling in which a symbol is divided into n sections in accordance with an oversampling frequency at or above n times the reception sampling frequency, where n is a natural number more than two;

a step of obtaining a binary symbol decision value by making symbol decision from the binary numbers of the plurality of partition phases subjected to the hard decision;

a step of obtaining a timing correlation value for each of the plurality of partition phases by calculating correlation between a binary number of the symbol decision value and a binary number of a partition phase subjected to the hard decision in a symbol period associated with the symbol decision value by performing multiplication when the binary number (1, −1) is assigned or performing "exclusive-or" when the binary number (1, 0) is assigned; and a step of cumulatively adding the obtained timing correlation values for a specific period or for a specific number of symbols and keeping track of changes in the plurality of timing correlation values.

5. The method according to claim 4, further comprising, prior to the data oversampling step:

a step of performing preamble detection on the data and determining which set of partition phase sets (phase 1, phase 2, phase 3), (phase 2, phase 3, phase 1), and (phase 3, phase 1, phase 2) is in synchronism with the symbol.

6. The method according to claim 4, wherein the data is a packet and wherein compensation is made within a packet period.

7. Circuitry of detecting a frequency offset (Δ) between data at a transmission symbol rate (fTx) transmitted from a transmitter and a reception sampling frequency (fRx) operating in a receiver on the basis of hard decision based on a binary number in the receiver, the circuitry comprising:

a data oversampling circuit that makes hard decision about which binary number (1 or −1) or (1 or 0) is assigned to each of a plurality of partition phases (phase 1, phase 2, and phase 3), the plurality of partition phases being obtained by sampling in which a symbol is divided into n sections in accordance with an oversampling frequency at or above n times the reception sampling frequency, where n is a natural number more than two;

a circuit that obtains a binary symbol decision value by making symbol decision from the binary numbers of the plurality of partition phases subjected to the hard decision;

a circuit that obtains a timing correlation value for each of the plurality of partition phases by calculating correlation between a binary number of the symbol decision value and a binary number of a partition phase subjected to the hard decision in a symbol period associated with the symbol decision value by performing multiplication when the binary number (1, −1) is assigned or performing "exclusive-or" when the binary number (1, 0) is assigned;

a circuit that cumulatively adds the obtained timing correlation values for a specific period or for a specific number of symbols to obtain a cumulative timing correlation value; and a circuit that compares a plurality of cumulative timing correlation values among the plurality of partition phases and detects the frequency offset.

8. The circuitry according to claim 7, further comprising:
a circuit that performs preamble detection and determines which set of partition phases among sets (phase 1, phase 2, phase 3), (phase 2, phase 3, phase 1), and (phase 3, phase 1, phase 2) is in synchronism with the symbol.

9. The circuitry according to claim 7, wherein the data is a packet and wherein compensation is made within a packet period.

10. The circuitry according to claim 7, wherein, where a packet has a size of L symbols, the circuitry is configured to include a buffer having a depth of Δ×L and make compensation by which data having no gap is reproduced through the buffer.

11. The circuitry according to claim 7, wherein part of the circuitry is achieved in combination with a computer readable article of manufacture causing a computer to execute readable instructions.

12. A computer readable article of manufacture tangibly embodying a non-transitory computer readable medium comprising: computer readable instructions which, when implemented, cause a computer to perform:

a data oversampling step of making a hard decision about which binary number (1 or −1) or (1 or 0) is assigned to each of a plurality of partition phases, (phase 1, phase 2, and phase 3), the plurality of partition phases being obtained by sampling in which a symbol is divided into n sections in accordance with an oversampling frequency at or above n times the reception sampling frequency, where n is a natural number more than two;

a step of obtaining a binary symbol decision value by making a symbol decision from the binary numbers of the plurality of partition phases subjected to the hard decision;

a step of obtaining a timing correlation value for each of the plurality of partition phases by calculating correlation between a binary number of the symbol decision value and a binary number of a partition phase subjected to the hard decision in a symbol period associated with the symbol decision value by performing multiplication when the binary number (1, −1) is assigned or performing "exclusive-or" when the binary number (1, 0) is assigned;

a step of cumulatively adding the obtained timing correlation values for a specific period or for a specific number of symbols to obtain a cumulative timing correlation value; and a step of comparing a plurality of cumulative timing correlation values among the plurality of partition phases to obtain the frequency offset (Δ).

13. A computer readable article of manufacture tangibly embodying a non-transitory computer readable medium comprising: computer readable instructions which, when implemented, cause a computer to perform:

a data oversampling step of making hard decision about which binary number (1 or −1) or (1 or 0) is assigned to each of a plurality of partition phases (phase 1, phase 2, and phase 3), the plurality of partition phases being obtained by sampling in which a symbol is divided into n sections in accordance with an oversampling frequency at or above n times the reception sampling frequency, where n is a natural number more than two;

a step of obtaining a binary symbol decision value by making symbol decision from the binary numbers of the plurality of partition phases subjected to the hard decision;

a step of obtaining a timing correlation value for each of the plurality of partition phases by calculating correlation between a binary number of the symbol decision value and a binary number of a partition phase subjected to the hard decision in a symbol period associated with the symbol decision value by performing multiplication when the binary number (1, −1) is assigned or performing "exclusive-or" when the binary number (1, 0) is assigned; and a step of cumulatively adding the obtained timing correlation values for a specific period or for a specific number of symbols and keeping track of changes in the plurality of timing correlation values.

* * * * *